Patented May 1, 1934

1,957,129

UNITED STATES PATENT OFFICE 1,957,129

PRODUCTION OF HIGHLY ACTIVE ALKALI CARBON BRIQUETTES FOR THE PREPARATION OF ALKALI CYANIDES

Friedrich Bartling, Huglfing, Germany; Jenny Bartling, legal representative of said Friedrich Bartling, deceased, assignor to Alterum Kredit-Aktien-Gesellschaft, Berlin, Germany No Drawing. Application March 24, 1931, Serial No. 525,022. In Germany April 14, 1930

1 Claim. (Cl. 23—81)

In order to obtain the starting materials for the preparation of alkali cyanides, it is usual to mix and briquette the two components namely the alkali starting material and the carbon in order to be able to pass this in a convenient and suitable form as well as in suitable admixture into the cyanidizing furnace.

Various ways of preparing suitable alkali carbon briquettes are known, for example soda may be mixed with coal and iron, the mixture moistened with hot water and then pressed warm to briquettes. These briquettes must then be dried very rapidly and are then passed on for use. In every case it is in general usual to employ sodium carbonate as alkali starting material.

Now it is also known that it is of very great importance for the desired formation of alkali cyanides that the alkali carbon briquettes should be in as highly active condition as possible. The most essential factor for attaining such a high degree of activity of the reaction materials is however the attainment of a high degree of porosity of the briquettes. The hitherto known processes however are defective in this respect and stand in need of improvement and it is an object of the present invention to improve these defects.

Accordingly the basic characteristic of the invention consists in employing sodium bicarbonate as alkali starting material in a process for the production of highly porous, highly active alkali carbon briquettes for the preparation of alkali cyanides or the like.

The advantageous effect of the new process is seen from the fact that the sodium bicarbonate has already been decomposed into sodium carbonate and carbon dioxide at about 300 to 400° C., that is to say, very much lower than the cyanidizing temperature, chemically combined water being set free at the same time. Since the gaseous and vaporous decomposition products are released from the briquettes, these naturally acquire an extremely loose structure, whereby however it should be observed there is no disintegration of the briquette but on the other hand a very desirable reinforcement of the whole structure is effected. In any case it is advantageous in this respect to mix the materials to be briquetted with a binder, for example common salt. Experiments have shown that in treating an alkali carbon briquette so produced, with nitrogen the conversion to alkali cyanide takes place extraordinarily rapidly and with a very high yield. Since the sodium bicarbonate is a preliminary product in the preparation of sodium carbonate, that is, of the soda for the most part hitherto used commercially for the preparation of the briquettes, then by employing sodium bicarbonate instead of soda, not only is a highly porous, highly active alkali carbon briquette obtained but also a step in the whole process in the hitherto known method for the preparation of the alkali starting material is saved.

The new process can be carried out for example by mixing the sodium bicarbonate with coke, for example lignite low temperature carbonization coke, and a binder, for example common salt, and pressing the mixture, preferably cold, to briquettes, and heating the pressed briquettes to about 300 to 400° C.

The heating is particularly advantageously and economically carried out by passing the briquettes, after pressing, into the cyanidizing furnace in which the calcination is effected before the cyanidizing.

One method of carrying out the new process is given by way of example as follows:—

For the preparation of alkali carbon briquettes for example 45 parts of a coke obtained by low temperature carbonization of lignite are mixed with 45 parts of sodium bicarbonate and 10 parts of common salt are added to this mixture as a binder. All of the materials are employed in powder or fairly finely granular form. The prepared mixture is pressed cold to small briquettes and these are passed into the cyanidizing furnace. Since the cyanidizing temperature is about 900–1000° C. the briquettes must pass through a temperature of 300 to 400° C. before they reach the stage of cyanidizing, so that at the time of reaction with the nitrogen which is passed into the furnace, the briquettes have already for some time acquired the character in which they have become highly porous and highly active.

I claim:—

The steps in the preparation of alkali cyanides or the like by cyanidizing at high temperature, which comprise mixing coke and sodium bicarbonate, pressing the mixture into crude briquettes, and preheating the crude briquettes with exclusion of air to a temperature of about 300 to 400° C. for effecting calcining of and the evolution of gas from said bicarbonate for producing a porous and loose structure of the briquettes without disintegration of the briquettes.

FRIEDRICH BARTLING.